(12) United States Patent
Warnes

(10) Patent No.: US 11,848,607 B2
(45) Date of Patent: Dec. 19, 2023

(54) SIMPLE CONSTANT CURRENT LIMIT FOR SEPIC OR BOOST CONVERTER

(71) Applicant: Murata Manufacturing Co., Ltd., Nagaokakyo (JP)

(72) Inventor: Frank Warnes, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 289 days.

(21) Appl. No.: 17/482,305

(22) Filed: Sep. 22, 2021

(65) Prior Publication Data

US 2022/0149736 A1     May 12, 2022

Related U.S. Application Data

(63) Continuation of application No. PCT/GB2020/050758, filed on Mar. 20, 2020.

(30) Foreign Application Priority Data

Mar. 26, 2019 (GB) ..................................... 1904186

(51) Int. Cl.
| | |
|---|---|
| *H02M 3/155* | (2006.01) |
| *H02M 1/00* | (2006.01) |
| *H02M 1/08* | (2006.01) |
| *H02M 3/158* | (2006.01) |

(52) U.S. Cl.
CPC ....... *H02M 3/1557* (2021.05); *H02M 1/0009* (2021.05); *H02M 1/08* (2013.01); *H02M 3/158* (2013.01)

(58) Field of Classification Search
CPC .... H02M 3/1557; H02M 1/0009; H02M 1/08; H02M 3/158
See application file for complete search history.

(56) References Cited

U.S. PATENT DOCUMENTS

| | | | |
|---|---|---|---|
| 2002/0196644 A1* | 12/2002 | Hwang | H02M 1/36 363/89 |
| 2016/0087542 A1* | 3/2016 | Warnes | H02M 1/32 363/21.05 |

OTHER PUBLICATIONS

Official Communication issued in International Patent Application No. PCT/GB2020/050758, dated Jun. 9, 2020.
Zhou et al., "A dual-path, current-sensing resistor-free boost LED driver with fast PWM dimming", Applied Power Electronics Conference and Exposition (APEC), Mar. 17, 2013, pp. 848-853.

* cited by examiner

*Primary Examiner* — Adolf D Berhane
*Assistant Examiner* — Afework S Demisse
(74) *Attorney, Agent, or Firm* — Keating & Bennett, LLP

(57) ABSTRACT

A circuit for supplying an error signal to a controller in a boost or SEPIC DC-DC converter includes first, second, and third Zener diodes, first, second, and third resistors, and a MOSFET or BJT switch. The circuit includes, connected to a common voltage input source, a first branch including the switch, the first Zener diode and the first resistor, a second branch including the second Zener diode and the second resistor. The first and second branches are mutually connected to the third resistor, and the third resistor is connected to the controller. A third branch includes the third Zener diode and connections to the base or gate of the switch and ground. Each of the first, second, and third Zener diodes are reverse-biased. The second and third Zener voltages are equal and higher than the first Zener voltage.

13 Claims, 6 Drawing Sheets

SIMPLE CONSTANT CURRENT LIMIT FOR SEPIC OR BOOST CONVERTER

CROSS REFERENCE TO RELATED APPLICATIONS

This application claims the benefit of priority to GB Patent Application No. 1904186.2 filed on Mar. 26, 2019 and is a Continuation Application of PCT Application No. PCT/GB2020/050758 filed on Mar. 20, 2020. The entire contents of each application are hereby incorporated herein by reference.

BACKGROUND OF THE INVENTION

1. Field of the Invention

The present invention relates to DC-DC converter devices, and in particular to SEPICs or boost converter devices with simplified current limiting circuitry.

2. Description of the Related Art

Conventionally, DC-DC converters based on SEPIC (Single-ended primary-inductor converter) or boost topologies convert an input DC voltage of a varying magnitude to an output voltage of fixed magnitude. In the SEPIC topology, the output voltage can be higher, equal, or lower than an input voltage of the same polarity. In a boost converter, the output voltage is higher than the input voltage of the same polarity.

Peak current detection can be used on the SEPIC and boost topologies to manage sudden changes in input voltage and output current. Peak current detection involves sampling the current passing through the switch of the SEPIC or boost topologies. Usually, this is done using a sense resistor or current transformer placed between the switch and the ground connection of the circuit.

A SEPIC or boost circuit topology circuit can be operated by a Pulse-Width Modulation (PWM) controller. The PWM controller can use the sampled current to determine an overall current limit of the SEPIC or boost DC-DC converter circuit.

However, there is a problem with using the sampled current to determine an overall current limit of the circuit in that the sampled peak current does not have a directly linear relationship with output current. In particular, the sampled peak current depends on the duty cycle of the circuit.

The current limit of the circuit must be set to allow for the highest peak current which occurs at low input voltages. This current limit means that the output currents of the circuit can reach very high magnitudes at high input voltages, and as such, the use of higher power capacity and larger components is necessary.

It would be beneficial to provide a pseudo constant peak current sampling measurement circuit to ensure that the PWM controller can set a current limit of the output current that is at a substantially constant low level across the input voltage range, hence negating the need to use high power components.

SUMMARY OF THE INVENTION

According to a first preferred embodiment of the present invention, a DC-DC converter including a SEPIC or boost topology is provided. The DC-DC converter includes a power input terminal; a power output terminal; a first switch; a switching controller including a signal sensing input to detect a current at the first switch and supply a control signal to the first switch to turn the first on or off, wherein switching of the switch controls the duty cycle of the DC-DC converter in dependence on the detected current, and the output current at the power output terminal varies non-linearly depending on the input voltage at the power input terminal and the duty cycle of the DC-DC converter determined by the switching controller. The converter further includes a current limiting circuit to limit the output current, wherein the current limiting circuit includes an input side connected between the power input terminal and the power output terminal, and an output side coupled to the signal sensing input of the switching controller, the input side and the output side being connected by at least a first signal path, and the current limiting circuit is capable of outputting a first variable error signal through the first signal path to the signal sensing input of the switching controller; the first variable error signal varies according to a first linear relationship with the input voltage of the DC-DC converter to compensate the output current at the power output terminal that varies non-linearly to provide a pseudo constant current at the power output terminal.

Optionally, the first signal path is operable over a first range of input voltages to provide the first variable error signal to approximate a non-linear error signal needed to compensate the output current at the power output terminal that varies non-linearly over the first range of input voltages.

Optionally, the current limiting circuit further includes at least a second signal path that connects the input side to the output side; wherein the second signal path is operable over a second range of input voltages, and able to provide a second variable error signal that approximates the non-linear error signal needed to compensate the output current at the power output terminal that varies non-linearly over the second range of input voltages.

Optionally, the first and second ranges of input voltages are discrete contiguous ranges of input voltages.

Optionally, each of the first signal path and the second signal path includes a path enabling component to activate the first signal path or the second signal path in which the path enabling component is included to output the first variable error signal or the second variable error signal to the switching controller when a predefined input voltage enabling threshold of the path enabling component is reached.

Optionally, the predefined input voltage enabling threshold of the first signal path and the second signal path are different, such that the first signal path and the second signal path are activated sequentially.

Optionally, the current limiting circuit includes a path limiting component to limit the magnitude of the output of the first variable error signal from the first signal path.

Optionally, the path limiting component is able to limit the magnitude of the output of the first variable error signal from the first signal path when the input voltage reaches a predetermined cut-off threshold, the predetermined cut-off threshold being the highest voltage in the first range of input voltages.

Optionally, the path limiting component includes a fixed voltage regulator connected to the first signal path and to the power input terminal.

Optionally, the fixed voltage regulator includes a second switch connected in series in the first signal path, and a Zener diode coupled to a control terminal of the second switch and coupled to a connection to ground.

Optionally, the first signal path includes a first resistive element connected in series, and the second signal path includes a second resistive element connected in series.

Optionally, the first and second resistive elements include resistors, and the path enabling components include Zener diodes.

Optionally, the DC-DC converter is included in an electronic device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A first example of a known SEPIC DC-DC converter circuit is described with reference to FIG. 1. The first example of the DC-DC converter device circuit includes capacitors C101 to C106, resistors R101 to R106, a switch Q101, first and second inductors L101 and L102, a voltage input source V101, a voltage output or load X101, a diode D101, ground connection G101, and a PWM controller U101. These components are connected as shown in FIG. 1.

Figure 1:
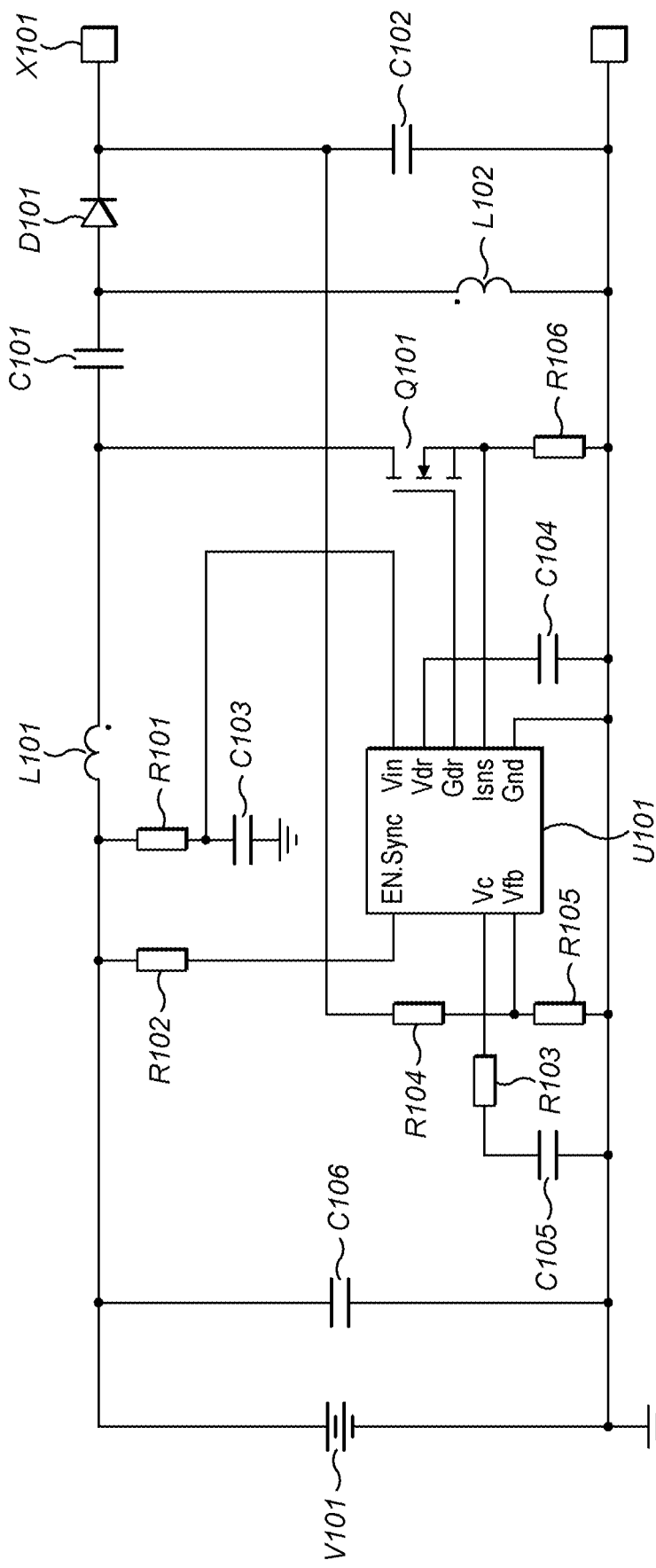
FIG. 1 is an example of a circuit diagram of a known SEPIC DC-DC converter.

It is to be understood that the components illustrated in FIG. 1 and the following description are also applicable to a boost topology circuit. A boost topology circuit is similar to the SEPIC DC-DC converter circuit, but lacks the second inductor L102 and the first capacitor C101.

Referring now to FIG. 1, a first terminal of the voltage input source V101 is connected in series to the first inductor L101, the capacitor C101, the diode D101 and the voltage output or load X101. The voltage output or load X101 is connected back to a ground connection G101 at a second terminal of the input voltage source through the capacitor C102.

The switch Q101 is connected in parallel between the first inductor L101, the capacitor C101, and the ground connection G101 at the second terminal of the voltage input source V101. The second inductor L102 is connected in parallel between the capacitor C101, the diode D101, and the ground connection G101 at the second terminal of the voltage input V101. The capacitor C102 is connected in parallel between the diode D101, the voltage output or load X101, and the ground connection G101 at the second terminal of the voltage input V101. The PWM controller U101 controls the switching action of the switch Q101.

The first inductor L101 and the second inductor L102 may be coupled (wound on a common core), or may be uncoupled inductors.

The secondary components of the circuit included in the SEPIC DC-DC converter circuit according to FIG. 1 are the resistors R101 to R106 and the capacitors C103 to C106.

The PWM controller U101 illustrated in FIG. 1 will now be described in more detail, with reference to the other components of the SEPIC topology circuit.

In FIG. 1, the PWM controller U101 is provided as an integrated circuit. The integrated circuit has a number of input terminals or pins that connect to the integrated circuit's interior circuitry. These pins include the input terminal (Vin), the driving voltage pin (Vdr), the gate drive pin (Gdr), the current sensing pin (Isns), the ground pin (Gnd), the voltage feedback pin (Vfb), the internal error amplifier output pin (Vc), and the enable and synchronization terminal (EN/SYNC). The connections of the pins of the PWM controller U101 will now be described.

The EN/SYNC pin of the PWM controller U101 is connected to the voltage input source V101 via the resistor R102.

The Vin pin of the PWM controller U101 is connected to the voltage input source V101 via the resistor R101. The power supply of the PWM controller U101 is supplied via the Vin pin. The capacitor C103 and the resistor R101 provide a stable input voltage to the PWM controller U101 via the Vin pin.

The Vdr pin of the PWM controller U101 is connected to the ground connection G101 via the capacitor C104. The capacitor C104 provides a stable input voltage to the Vdr pin. The Gdr pin of the PWM controller U101 is connected to the switch Q101. The switch Q101 in a SEPIC or boost topology DC-DC converter is often a field effect transistor, such as a MOSFET or JFET. The Gdr pin is connected to the gate of the MOSFET or JFET switch Q101 and controls whether the switch Q101 is open or closed, by supplying a voltage to the gate of the switch Q101.

The Isns pin of the PWM controller U101 is connected between the source of the switch Q101 and the ground connection G101 via the current sense resistor R106. The Isns pin senses the switching current of the switch Q101 by measuring the voltage across the current sense resistor 106 for the purposes of regulation and current limiting.

The Gnd pin of the PWM controller U101 is connected to the ground connection G101. The Vfb pin of the PWM controller U101 is connected between resistors R104 and R105. The resistors R104 and R105 act as a voltage divider to control the voltage that is provided to the Vfb pin of the PWM controller U101. The resistor R105 is connected to the ground connection G101 and the resistor R104 is connected between the capacitor C102 and the voltage output or load X101. The Vfb pin therefore obtains a feedback voltage proportional to the output of the SEPIC DC-DC converter circuit.

The Vc pin of the PWM controller U101 is connected to the ground connection G101 via the resistor R103 and the capacitor C105. The resistor R103 and the capacitor C105 set the correct closed loop stability parameters of the circuit.

The operation of the SEPIC DC-DC converter circuit according to FIG. 1 will now be discussed.

The SEPIC circuit according to FIG. 1 operates between two states. These two states are an off-state and an on-state, defined by the switch Q101 being open or closed respectively.

When the input voltage $V_{in}$ from the voltage input source V101 is first applied to the circuit and the switch Q101 is off, then the capacitor C101 is connected with the voltage input source V101 through the first inductor L101 and the second inductor L102, so it immediately charges to the same input voltage $V_{in}$ as the input voltage from the voltage input source V101.

In the on-state, the switch Q101 is closed so the capacitor C101 can discharge. The capacitor C101 has a relatively large capacitance value, and, because the duration of the on-state is very short, the capacitor C101 will not discharge completely and essentially remains at a DC voltage equivalent to the input voltage $V_{in}$ with a small ripple voltage during the whole operating cycle. Current flows in a first path from the capacitor C101, through the switch Q101 to the second inductor L102, in an anti-clockwise fashion according to FIG. 1. The second inductor L102 is therefore charged with a negative voltage by the capacitor C101 when the circuit is in the on-state. Current also flows in a second path from the voltage input source V101, through the first inductor L101 and the switch Q101 to the ground connection G101, in a clockwise fashion according to FIG. 1. The first inductor L101 is therefore charged by the voltage input source V101 when the circuit is in the on-state.

During the on-state, the capacitor C102 discharges to supply the output or load X101.

In the off-state, the switch Q101 is open, and the capacitor C101 is charged again to the input voltage $V_{in}$. Current flows in a third path from the inductor L101 through the capacitor C101 and diode D101 to the output or load X101, in a clockwise fashion according to FIG. 1.

The capacitor C101 is charged by the voltage input source V101 and the first inductor L101, which discharges. The second inductor L102 also discharges, through the diode D101 to supply the output or load X101, and to charge the capacitor C102. Current also therefore flows in a fourth current path from the second inductor L102 through the voltage output or load X101 and the capacitor C102, in a clockwise fashion according to FIG. 1. The current from the inductors L101 and L102 charge the capacitors C101 and C102, respectively. This prepares the circuit for the next on-state, in which the capacitors C101 and C102 are discharged, and the process repeats.

The SEPIC DC-DC converter circuit according to FIG. 1 therefore functions by switching between storing and transferring energy from two inductors L101 and L102 to provide an output voltage $V_{out}$ from the input voltage $V_{in}$. The SEPIC topology allows the output voltage to be equal, lower, or higher than the input voltage. To control the DC output, the PWM controller U101 monitors the feedback voltage and adjusts the duty cycle applied to the switch Q101. If the output is low then the duty cycle is increased. If the output is high then the duty cycle is reduced. The duty cycle D is linked to the input and output voltages by the following equation:

$$\frac{V_{out}}{V_{in}} = \frac{D}{1-D} \quad (1)$$

Similarly, for current at the switch Q101, $I_Q$:

$$I_Q = I_{out} \frac{D}{1-D} \quad (2)$$

Where $I_{out}$ is the output current. The current at the switch Q101 is therefore dependent on the output current and the duty cycle of the circuit. The duty cycle must therefore be controlled in order to maintain a safe operating current and proper switching function, so that the SEPIC converter can correctly function as discussed above.

The operation of switching between the on-state and the off-state of the switch Q101 will now be discussed in more detail.

As mentioned above, the PWM controller U101 controls the duty cycle of the circuit by turning the switch Q101 on and off through the Gdr pin. In order to do this, the Gdr pin of the PWM controller U101 is connected to the switch Q101 as discussed previously.

The switch Q101 is usually a MOSFET or JFET. Supplying, or preventing the supply of, a voltage from the Gdr pin of the PWM controller U101 to the gate of the MOSFET or JFET respectively closes the switch Q101 so as to allow current to pass through the switch.

In order to inform the PWM controller U101 of when to supply voltage to the switch Q101, and when to stop the voltage supply, peak current detection may be used at the switch Q101.

Peak current detection is a method of sensing the current at the source of the MOSFET or JFET switch Q101. This is done using the resistor R106, positioned between the switch Q101 and the ground connection G101, at the second terminal of the voltage source V101. The resistor R106 thus functions as a sense resistor. The voltage across the resistor R106 is proportional to the current to be measured. The PWM controller U101 determines the current measurement via the Isns pin to determine the voltage supply at the gate of the MOSFET or JFET switch Q101 via the Gdr pin of the PWM controller U101.

This allows the PWM controller to respond to changes in the current level at the source of the switch Q101 on a pulse by pulse basis. This means that the circuit can respond to changes to input voltage or output current, according to equations (1) and (2) above, by modifying the duty cycle. The PWM controller U101 also uses the current measurement to determine an overall current limit of the SEPIC or boost DC-DC converter circuit.

However, there is a problem with using this current measurement to change the duty cycle and determine an overall current limit of the output current in this way, in that the peak current measurement does not have a linear relationship with output current, according to equation (2). If the SEPIC or boost DC-DC converter circuit has a wide input voltage range, the current limit must be set to allow for the highest peak current which occurs at low input voltage $V_{in}$ and high duty cycle D according to equation (1). At high duty cycles, the amount of output current that can be taken from the converter at high input voltages $V_{in}$ is very high. This issue is further exacerbated due to the fact that, at high input voltages, the total input power is very high. In the circuit according to FIG. 1, components with high power capabilities are therefore required, so that the converter can survive an overcurrent event. Without the high power components, there is a risk that the SEPIC DC-DC converter circuit according to FIG. 1 could be irrevocably damaged by excess current during an overcurrent event.

The SEPIC DC-DC converter circuit according to FIG. 1 therefore has disadvantages in that components can be expensive and physically large, meaning the converter itself is expensive and space consuming.

Figure 2:
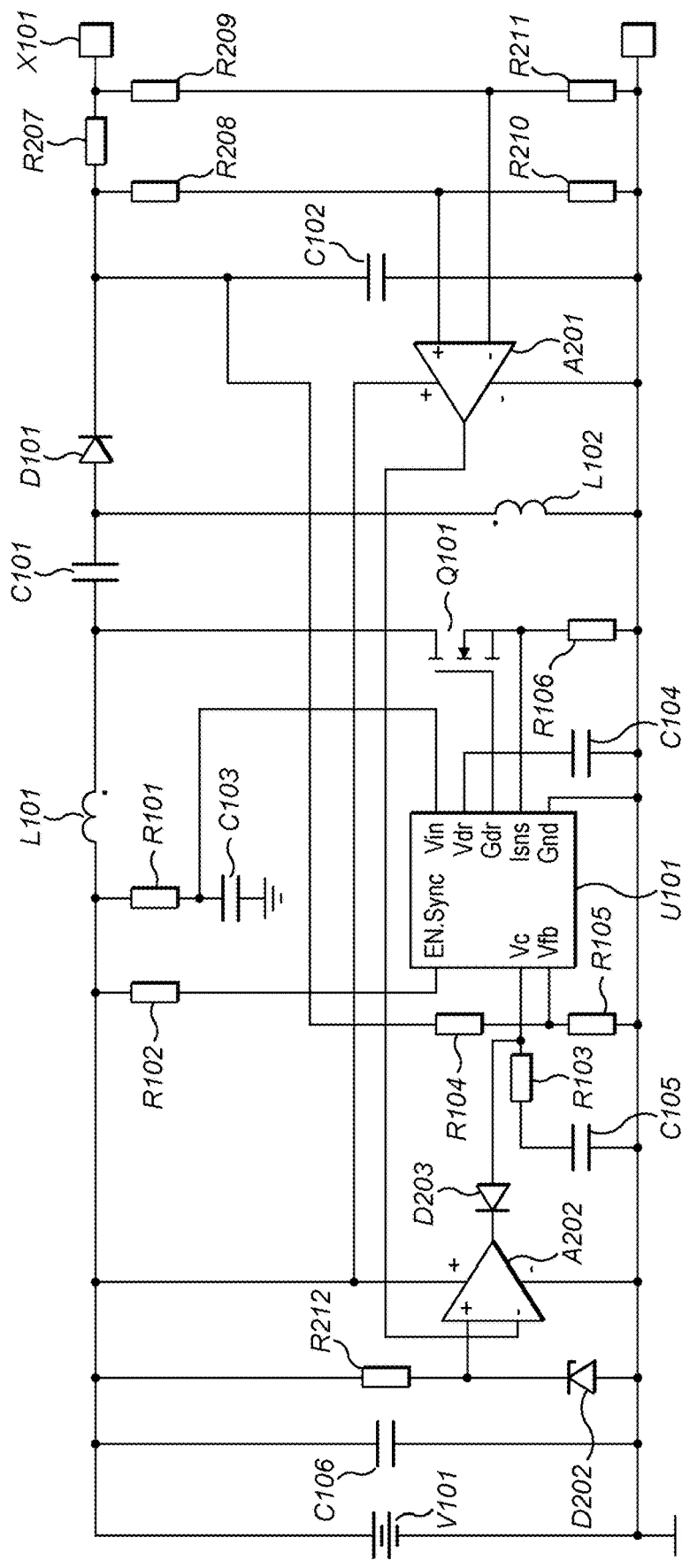
FIG. 2 is an example of a circuit diagram of a known SEPIC DC-DC converter with a connected amplifier and comparator.

FIG. 2 shows a second example of a known SEPIC DC-DC converter circuit. The second example of the DC-DC converter circuit includes capacitors C101 to C106, resistors R101 to R106, switch Q101, inductors L101 and L102, voltage input source V101, voltage output or load X101, diode D101, and a PWM controller U101. These components are connected as shown in FIG. 2, and provide the same function as the corresponding components described with reference to FIG. 1.

The second example of the SEPIC DC-DC converter circuit further includes resistors R207 to R212, an amplifier A201, a comparator A202, and diodes D202 and D203. These components are not found in the first example of a SEPIC DC-DC converter circuit according to FIG. 1.

These components are arranged as illustrated in FIG. 2. In particular, the resistors R207 to R211 and the amplifier A201 form a high side current sensing system. The resistor R207 is a high-side current sensor connected between the voltage output or load X101 and the diode D101. The resistors R208 to R211 and the amplifier A201 form a differential amplifier circuit, which is connected around the resistor R207. In particular, the resistor R208 is connected in parallel to one terminal of the resistor R207, and the resistor R209 is connected in parallel to the opposing terminal of the resistor R207. Resistors R208 and R209 are connected in series to resistors R210 and R211, respectively, to form two separate voltage dividers. The resistors R208 and R210 form one voltage divider, and the resistors R209 and R211 form another voltage divider. The resistors R210 and R211 connect to the ground connection G101 at the second terminal of the voltage input source V101.

The amplifier A201 is an operational amplifier, with an inverting and non-inverting input. The non-inverting input is connected between the voltage divider of the resistors R208 and R210, and the inverting input is connected between the voltage divider of the resistors R209 and R211. The output of amplifier A201 is compared with a reference voltage across the diode D202 using the comparator A202.

The output of the amplifier A201 is connected to the inverting input of the comparator A202. The non-inverting input of the comparator A202 is connected between the resistor R212 and the diode D202, which are arranged in parallel across the voltage input source V101. The resistor R212 and the diode D202 form a voltage divider. The diode D202 is a Zener diode, which has a predetermined Zener voltage. Once the Zener voltage is reached, current can flow not only from the anode to the cathode as with conventional diodes, but also from the cathode to the anode. Furthermore, once the Zener voltage is reached, the voltage across the diode D202 remains approximately constant over a wide range of currents. This makes the Zener diode D202 very good at generating a stable reference voltage for the comparator A202.

The circuit according to FIG. 2 functions as follows. The current sensing resistor R207 monitors the output current $I_{out}$. The voltage over the resistor R207 is monitored by the amplifier A201 and is then compared to a reference voltage supplied by the Zener diode D202 and the resistor R212, at the comparator A202. When the voltage output from the comparator A202 exceeds a set value, the output of the comparator A202 pulls down on the internal error amplifier at the Vc pin of the PWM controller U101. This causes the PWM controller U101 to reduce the duty cycle of the DC-DC converter circuit and therefore limit the circuit current, according to equation (2). In particular, if the voltage input to the comparator A202 from the amplifier A201 is less than the reference voltage from the resistor R212 and the Zener diode D202, then the output of the comparator A202 will saturate at the positive supply rail. Thus, the output from the Vc pin cannot flow to ground through the diode D203 and the negative supply rail of the comparator A202. The diode D203 is reverse biased and since the voltage output from the comparator A202 at the cathode of diode D203 is higher than the voltage at the anode of diode D203, no current can flow through the diode D203. Conversely, when the voltage input to the comparator from the amplifier A201 is greater than the reference voltage from the resistor R212 and the Zener diode D202, the output of the comparator will change state and saturate at the negative supply rail. This provides the Vc pin with a connection to the ground connection G101, through the diode D203 and the negative output rail of the comparator A202. Since the output from the comparator is less than the voltage at the anode of the diode D203, the diode D203 allows current to flow from the Vc pin to the ground connection G101. Thus, the output of the comparator A202 pulls down on the internal error amplifier at the Vc pin of the PWM controller U101 as discussed above.

There are disadvantages with this method of limiting circuit current. In particular, the second current sensing resistor R207 is positioned between the diode D101 and the voltage output or load X101, which means that the voltage output $V_{out}$ is decreased, due to the voltage drop over the resistor R207. Furthermore, including the amplifier A201 and the comparator A202 as well as resistors R207 to R212 means that a lot of additional components are used. These disadvantages mean that the voltage output range of the DC-DC converter circuit is reduced, and that the converter is space consuming and more expensive, due to an increased number of constituent components.

Figure 3:
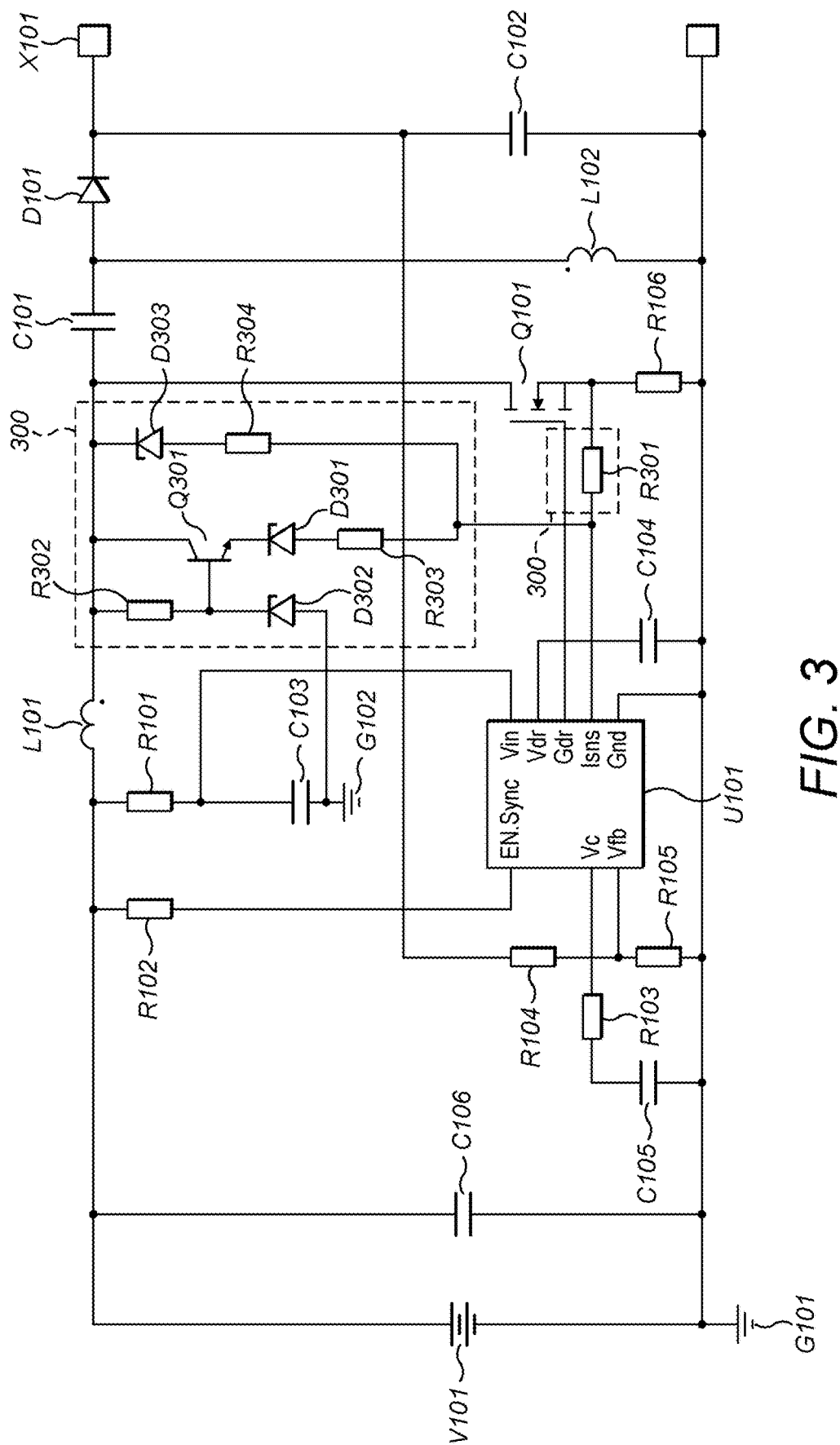
FIG. 3 is a circuit diagram of a SEPIC DC-DC converter, including a pseudo constant peak measurement circuit according to a preferred embodiment of the present invention.

A preferred embodiment of the present invention will now be discussed with reference to FIG. 3. FIG. 3 shows a SEPIC topology DC-DC converter circuit. The SEPIC DC-DC converter circuit includes capacitors C101 to C106, resistors R101 to R106, switch Q101, inductors L101 and L102, voltage input source V101, voltage output or load X101, diode D101, ground connections G101 and G102, and a PWM controller U101. These components are connected as shown in FIG. 3, and provide the same function as the corresponding components described with reference to FIG. 1. It is to be understood that the following description regarding a preferred embodiment of the present invention may also apply to a boost topology circuit.

The DC-DC converter circuit further includes a pseudo constant peak measurement circuit 300 according to a preferred embodiment of the present invention.

The pseudo constant peak measurement circuit 300 according to a preferred embodiment of the present invention includes several primary branches connected between the voltage input source V101 of the SEPIC DC-DC converter circuit and the Isns pin of the PWM controller U101 of the SEPIC DC-DC converter circuit.

The pseudo constant peak measurement circuit 300 outputs a variable error current depending on the state of the several primary branches at any given time. The possible states of the several primary branches include: a variable active state, a constant active state, and an off-state. The variable and constant active states are defined as being electrically conductive, meaning a flow of current exists through a primary branch when the primary branch is in one of the active states. When a primary branch is in the variable active state, an error current from the primary branch increases or decreases in a substantially linear fashion as the input voltage from the voltage input source V101 increases or decreases respectively. When a primary branch is in the constant active state, an error current from the primary branch stays substantially constant for increasing input voltage from the voltage input source V101. In the off-state of a primary branch, no current flows through the primary branch. When the several primary branches are not in respective variable active states, the several primary branches are either in a constant active state or in an off-state.

Each of the several primary branches includes a resistor of a predetermined resistance. The error current output by the pseudo peak measurement circuit 300 depends on the resistance of the resistor of the primary branch or branches that are in the variable or constant active states.

The variable error current that is output by the pseudo constant peak measurement circuit 300 is linearly proportional to the input voltage from the voltage input source V101. This is achieved by having a primary branch in the variable active state. Specifically which primary branch is in the variable active state is determined by the input voltage from the voltage input source V101. The variable active state of each of the several primary branches are largely exclusive, meaning that two or more of the several primary branches cannot in effect be in the variable active state at the same time. In practice there will be some slight overlap as the variable active states switch over from one primary branch to another primary branch. Each of the several primary branches are in respective variable active states for different input voltages or separate input voltage ranges.

The state of a primary branch is determined by voltage-dependent electrical components connected in each primary branch in the pseudo peak measurement circuit 300. These voltage-dependent electrical components may include Zener diodes. The electrical components may also include a switch, such as a MOSFET, JFET, Bipolar Junction Transistor (BJT) or the like.

Each primary branch of the pseudo constant peak measurement circuit 300 may have a variable active state minimum threshold input voltage and a variable active state maximum threshold voltage. At the variable active state minimum threshold voltage, the primary branch in question turns from the off-state to the variable active state. At the variable active state maximum threshold voltage, the primary branch in question turns from the variable active state to the constant active state.

Alternatively, at least one of the primary branches of the several primary branches may only include a variable active state minimum threshold voltage, or a variable active state maximum threshold voltage, but not both of these thresholds.

For instance, the primary branch that outputs an error current at low input voltages may not have a variable active state minimum threshold, such that the primary branch is in the variable active state from minimal input voltages up to the variable active state maximum threshold of the primary branch.

Similarly, the primary branch that outputs an error current at high input voltages may not have a variable active state maximum threshold, such that the primary branch is in the variable active state from the variable active state minimum threshold of the primary branch and remains in the variable active state for high input voltages.

The entire voltage input range of the SEPIC DC-DC converter may be covered by the several primary branches of the pseudo constant peak measurement circuit 300. In other words, one branch may always be in the variable active state.

Alternatively, the range of input voltages for which any primary branch of the several primary branches is in a variable active state may be a sub-range of the total input voltage range of the SEPIC DC-DC converter.

The pseudo constant peak measurement circuit 300 may include two or more primary branches. The pseudo constant peak measurement circuit 300 may also include sub-branches. The sub-branches may function to aid the switching process between the variable active state, the constant active state, and the off-state of a particular primary branch.

For instance, a sub-branch may be connected to a primary branch and to a ground connection. The sub-branch may include voltage dependent components such as a Zener diode or the like, between the connection to the primary branch and the connection to ground, to form a fixed voltage regulator of the primary branch.

The voltage dependency of the voltage dependent component of the sub-branch is predetermined such that at the variable active state maximum threshold voltage of the primary branch, the voltage dependent component of the sub-branch becomes active and clamps the voltage of the primary branch to the variable active state maximum threshold voltage of the primary branch, switching the state of the primary branch from the variable active state to the constant active state.

A sub-branch may be provided for each primary branch. Alternatively, there may be fewer sub-branches than primary branches.

The pseudo constant peak measurement circuit 300 described above outputs an error current to the Isns pin of the PWM controller U101 which raises the current limit voltage at the Isns pin. The raise in voltage and the rate of change of the error current according to the input voltage is determined by which primary branch or branches are in the variable or constant active states. A primary branch in the variable active state outputs an error current that varies linearly with changes to the input voltage. A primary branch in the constant active state provides a constant error current. If more than one primary branch is in either the variable or constant active states, the error current output by each primary branch is combined to provide the total error current at the Isns pin of the PWM controller U101.

The purpose of each primary branch having this effect on the output error current is that each of the primary branches can be used to provide an asymptotic approximation of the required error current needed to maintain a low current limit of the SEPIC DC-DC converter circuit. This is discussed in more detail with regard to FIG. 3.

In FIG. 3, the pseudo constant peak measurement 300 circuit includes resistors R301 to R304, a switch Q301, and a first, second and third Zener diode D301 to D303 respectively.

The pseudo constant peak measurement circuit 300 is connected to the rest of the SEPIC topology DC-DC converter circuit. In particular, the resistor R302 and the second Zener diode D302 are connected in series between the first inductor L101 and the capacitor C101 on one side and between the capacitor C103 and the ground connection G102 on the other side. The anode of the second Zener diode D302 is connected between the capacitor C103 and the ground connection G102, and the cathode of the second Zener diode D302 is connected to the resistor R302. The branch including resistor R302 to the ground connection G102 represents a sub-branch as discussed above.

The first primary branch of the pseudo constant peak measurement 300 includes the switch Q301, the first Zener diode D301, and the resistor R303. The switch Q301 is a bipolar junction transistor, but may alternatively be a field effect transistor such as a JFET or MOSFET. The base of the switch Q301 is connected between the resistor R302 and the cathode of the second Zener diode D302. The collector of the switch Q301 is connected between the first inductor L101 and the capacitor C101. The emitter of the switch Q301 is connected to the cathode of the first Zener diode D301. The anode of the first Zener diode D301 is connected to the resistor R303. The resistor R303 is connected to the Isns pin of the PWM controller U101 via a branch node, which connects the primary branches to the Isns pin. The second primary branch of the pseudo constant peak measurement 300 includes the Zener diode D303 and the resistor R304. The cathode of the third Zener diode D303 is connected between the first inductor L101 and the capacitor C101. The resistor R304 is connected to the anode of the third Zener diode D303. The resistor R304 is connected to the Isns pin of the PWM controller U101 via the branch node.

The resistor R301 is connected between the resistor R106, which performs current sensing, and the branch node of the pseudo constant peak measurement 300. The current from the resistor R106 travels through the resistor R301. The purpose of the resistor R301 is to raise the peak level of the current limit voltage at the Isns pin of the PWM controller U101. This current limit voltage is subject to change based on the error current provided by the primary branches of the pseudo constant peak measurement 300 to the current sensing pin Isns of the PWM controller U101.

The pseudo constant peak measurement circuit 300 thus provides an error current which raises the current limit voltage at the current sensing pin of the controller U101. In other words, the magnitude of the voltage at the Isns pin of the controller U101 is modified from the voltage across the current sensing resistor R106 and resistor R103 by the supply of an error current from the pseudo constant peak measurement circuit 300. The voltage at the Isns pin of the PWM controller U101 is raised when an error current is delivered to the Isns pin of the controller U101. The error current delivered to the Isns pin, and the rate of change of the error current for a given change in input voltage of the SEPIC DC-DC converter is dependent on which primary branch is in a variable or constant active state.

As explained with reference to FIG. 1, typical SEPIC converters suffer from a non-linear current limit. An example of a non-linear current limit of a test SEPIC converter circuit is shown in FIG. 4.

Figure 4:
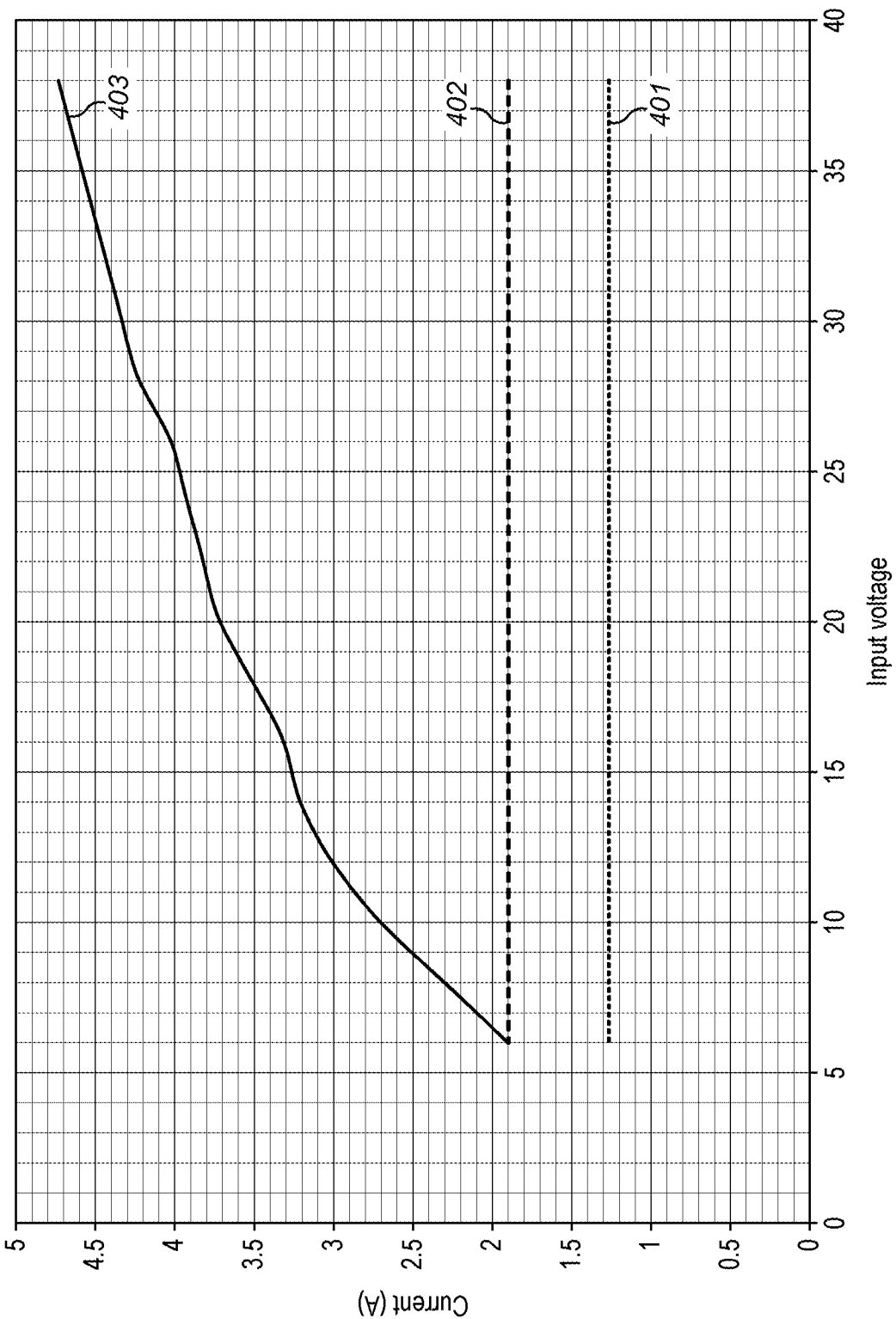
FIG. 4 is a graph displaying three current limits from a SEPIC DC-DC converter test circuit.

FIG. 4 is a graph showing the relationship between SEPIC DC-DC converter current and input voltage of the test SEPIC converter circuit and includes three separate lines. A first line 401 represents the current when the circuit is at full load. A second line 402 represents the current when the circuit is at an ideal current limit. A third line 403 represents the actual current limit of the test SEPIC converter circuit in the range of input voltages from 6 V to 38 V.

At higher input voltages, the output current and the power increase which means high power capacity components must be used, as can be determined from equations (1) and (2). However, in the preferred embodiments according to the present invention, an error current is provided to the Isns pin of the PWM controller U101 to modify the voltage at the current sensing pin Isns of the controller U101. The error current provided to the Isns pin is used to compensate the non-linear current limit in typical SEPIC converters, in order to approximate a linear current limit according to the second line 402 of FIG. 4 across the entire input voltage range of a SEPIC converter.

Figure 5:
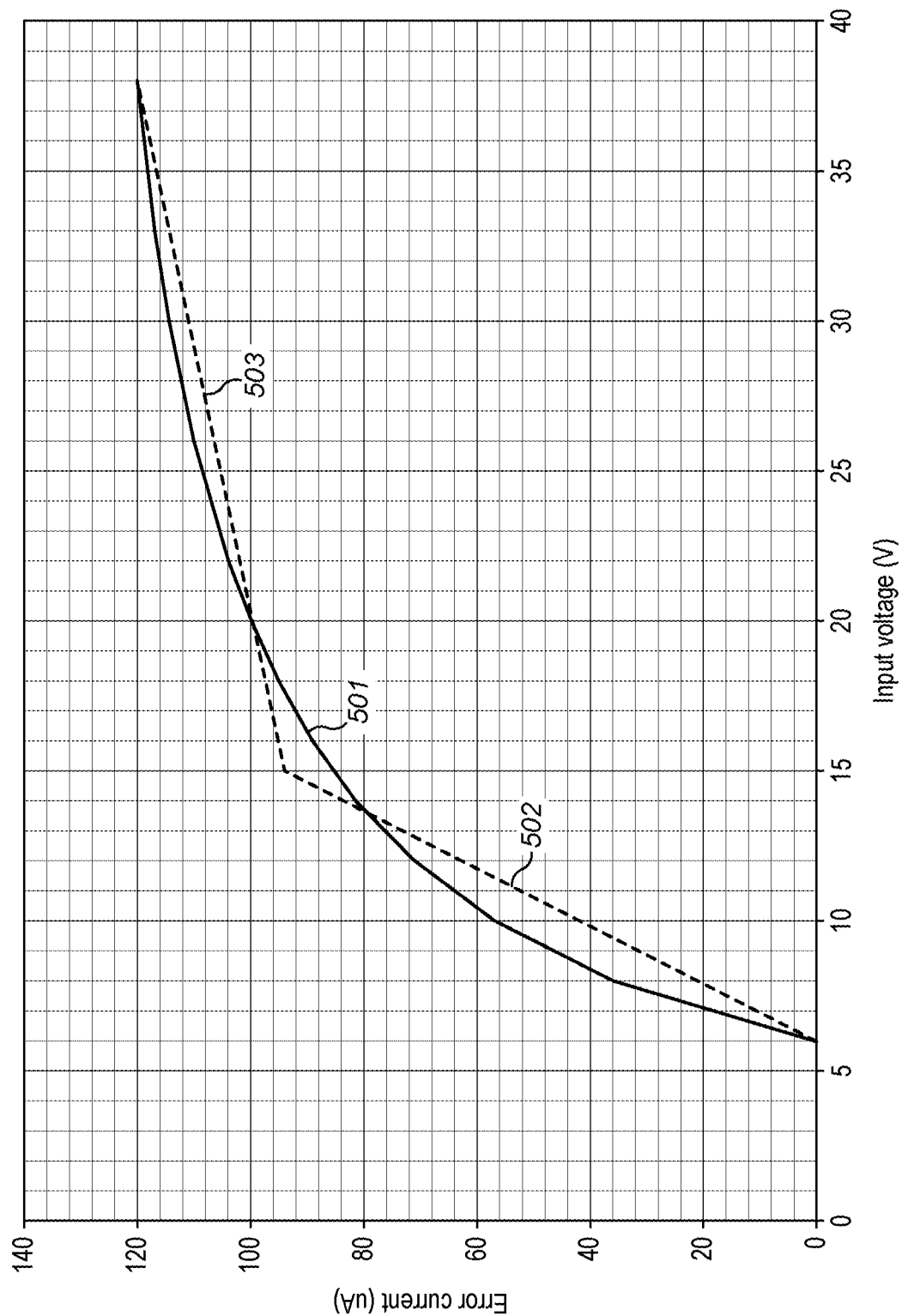
FIG. 5 is a graph displaying the error current required to correct the non-linearity of the current limit of the SEPIC DC-DC converter test circuit.

Given that the current limit of the SEPIC DC-DC converter is non-linear as can be seen in the third line 403 of FIG. 4, the error current required to stabilize the current limit to a linear level is not directly proportional to the input voltage. The relationship between the error current and the input voltage is instead, approximately logarithmic. Thus, it is difficult to derive the error current required to stabilize the current limit to a linear level, unless microprocessors or complex operational amplifier circuits are used. However, as discussed with reference to FIG. 2, such circuits include many more components and are therefore more space consuming and expensive. Instead of including these components, the pseudo constant peak measurement circuit 300 of a preferred embodiment of the present invention works based on the approximation that the relationship between the input voltage and required error current includes a plurality of linear relationships, represented by a plurality of linear asymptotes to the non-linear relationship between input voltage and required error current. The non-linear relationship between the input voltage and required error current, and the plurality of linear asymptotes that approximate this relationship are shown in FIG. 5. FIG. 5 illustrates an example of the non-linear relationship 501 between the input voltage and required error current of the test SEPIC converter circuit, a first linear asymptotic relationship 502, and a second asymptotic relationship 503, where the first 502 and second 503 asymptotic relationships approximate the non-linear relationship 501. The approximation of the non-linear relationship 501 between the input voltage and required error current to a collection of linear relationships 502 and 503 makes it easier to provide the correct error current to the Isns pin of the controller U101 based on the input voltage.

The first 502 and second 503 asymptotic relationships are produced using the pseudo constant peak measurement circuit according to the preferred embodiment of the present invention as shown in FIG. 3.

The error current according to the first asymptotic relationship 502 shown in FIG. 5 is supplied by the first primary branch of the pseudo constant peak measurement circuit 300. This branch includes the switch Q301, the Zener diode D301 and the resistor R303. The sub-branch including the resistor R302, Zener diode D302 and the ground connection G102 aids in determining whether to cause the first primary branch to be in the variable active state or the constant active state. In particular, the switch Q301 is initially biased on by the resistor R302 at low input voltages, but no current flows through the switch Q301 until the input voltage reaches the Zener voltage of the first Zener diode D301. The first Zener diode D301 therefore functions as a current blocking component, at the emitter of the switch Q301, up to the Zener voltage of the first Zener diode D301. Once the Zener voltage of the first Zener diode D301 has been reached, current through the diode D301 increases linearly and travels through the resistor R303, which raises the current limit voltage sensed at the Isns pin of the controller U101. The first Zener diode D301 thus acts as the voltage dependent component that causes the first primary branch to be to the variable active state, once the Zener voltage of the first Zener diode D301 is reached. The Zener voltage of the first Zener diode D301 is therefore predetermined or set as the variable active state minimum threshold voltage of the first primary branch. The variable active state minimum threshold voltage of the first primary branch represents the start of the first asymptotic relationship 502 shown in FIG. 5. In FIG. 5, this is 6 V. Therefore, the first Zener voltage of the first Zener diode D301 may be set to 6 V.

Similarly, the end of the first asymptotic relationship 502 is represented as the variable active state maximum threshold voltage of the first primary branch. In FIG. 5, this is 15 V. Once the input voltage reaches the variable active state maximum threshold voltage of the first primary branch, the Zener voltage of the second Zener diode D302 of the sub-branch is reached. Thus, the Zener voltage of the second Zener diode D302 may be set to 15 V. This means that current flows from the resistor R302 through the second Zener diode D302 to the ground connection G102. Due to the Zener voltage of the second Zener diode D302 being reached, the sub-branch functions as a fixed voltage regulator of the first primary branch. The voltage at the base of the switch Q301 stops increasing, causing the voltage at the emitter to also stop increasing, such that it becomes constant (clamped) at the Zener voltage of the second Zener diode D302 (i.e., 15 V). Hence, the supply of current in the path of the first primary branch, discussed above according to the first asymptotic relationship 502 shown in FIG. 5, becomes constant when the input voltage reaches the Zener voltage of the second Zener diode D302. In other words, once the input voltage reaches the Zener voltage of the second Zener diode D302, the state of the first primary branch switches from the variable active state to the constant active state. This sets the switch Q301 to deliver a constant error current to the Isns pin of the controller U101 from the first primary branch.

The error current according to the second asymptotic relationship 503 shown in FIG. 5 is supplied by the second primary branch of the pseudo constant peak measurement circuit 300. This branch includes the third Zener diode D303 and the resistor R304. The start of the second asymptotic relationship 503 represents the variable active state minimum threshold voltage of the second primary branch. In FIG. 5, this is 15 V. Since this point is both the variable active state maximum threshold voltage of the first primary branch, and the variable active state minimum threshold voltage of the second primary branch, when the first primary branch switches to the constant active state, the second primary branch simultaneously switches from the off-state to the variable active state. The Zener diode D303 has a Zener voltage set to the variable active state minimum threshold voltage of the second primary branch. Thus, the Zener voltages of the diodes D302 and D303 are equal at 15 V and when the Zener voltage of the second Zener diode D302 is reached, the Zener voltage of the third Zener diode D303 is also reached. The consequence of this is that, when the Zener voltage of the second Zener diode D302 is reached, the flow of current to the emitter of switch Q301 becomes constant and at the same time current flow through the third Zener diode D303 starts to increase at a lower rate and the two currents are combined. This current then travels towards the Isns pin of the PWM controller U101, which raises the current limit voltage sensed at the current sensing pin of the controller U101.

It is to be understood that a third or more primary branches may also be included within the pseudo constant peak measurement circuit 300. A third primary branch may require the second primary branch to have a sub-branch and a switch such as the first primary branch and sub-branch arrangement according to FIG. 3. In this way the second primary branch may be switched from the variable active state to the constant active state when the third primary branch is switched from the off-state to the variable active state.

The number of primary branches may be selected based on how many asymptotes are desired of the error current according to FIG. 5. For three asymptotes, three primary branches and two sub-branches are required.

The choice of resistance of resistors R303 and R304 determines the amount of error current supplied to the resistor R301 during the first asymptotic relationship 502 and the second asymptotic relationship 503 respectively. From Ohm's Law:

$$V=IR \qquad (4)$$

The current/supplied to the Isns pin of the controller U101 according to a voltage V is inversely proportional to the resistance R of a resistor in the current path. Therefore, for a changing input voltage $V_{in}$, the gradient of the asymptotic relationships 502 and 503 in FIG. 5, or otherwise, the rate of change of error current, goes with 1/R. Therefore, in order to provide a relationship with a relatively steeper gradient, or in other words, to increase the rate of change of error current according to an increase in input voltage, the resistance in the current path should be decreased. Conversely, to provide a relationship with a relatively shallow gradient, or in other words, to decrease the rate of change of error current according to an increase in input voltage, the resistance in the current path should be increased.

Therefore, to achieve the first asymptotic relationship 502 and the second asymptotic relationship 503 between input voltage and error current according to FIG. 5, the resistances in the current paths should be lower and higher respectively. Thus, the resistor R303, responsible for the first asymptotic relationship 502 according to FIG. 5 has a lower resistance than the resistor R304, which is in the current path responsible for the second asymptotic relationship 503 according to FIG. 5.

To obtain the data in FIG. 5, the resistor R303 is rated as 91 kΩ and the resistor R304 is rated as 820 kΩ. As discussed above, the first Zener diode has a Zener voltage of 6 V, and the second and third Zener diodes both have a Zener voltage of 15 V. The resistor R301 has a rating of 1 kΩ, and the resistor R302 has a rating of 100 kΩ.

It is to be understood that the examples of Zener voltages and resistances given above are exemplary only and are intended only to match with the voltages and relationships given in FIG. 5. Different Zener voltages may be used depending on where a user of a preferred embodiment of the present invention would like to set the various thresholds of the primary branches, to set specific beginning and end points of the first and second asymptotic relationships 502, 503 according to FIG. 5. Similarly, different resistances may be used depending on the desired gradient of the first and the second asymptotes 502 and 503.

In the example of the test SEPIC converter that gives rise to the data and lines in FIGS. 4 and 5, the resistor R303 is rated at 91 kΩ and the resistor R304 is rated at 820 kΩ. The resistor R303 therefore has a resistance approximately equal to ⅑ of the resistance of the resistor R304. This relationship is reflected in FIG. 5, which shows that the first asymptotic relationship 502 has a gradient that is approximately nine times steeper than the gradient of the second asymptotic relationship 503, since the gradient of these relationships is proportional to 1/R.

It is to be understood that other values of resistance of the resistors R303 and R304 may be used to produce asymptotes that approximate the non-linear relationship 501 between input voltage and required error current. Furthermore, the non-linear relationship 501 between required error current and input voltage may differ for different SEPIC converter circuits, and/or for different input voltage ranges. SEPIC converter circuits may be used in applications such as Heavy Goods Vehicle (HGV) operations, motorcycle operations, military vehicle operations, military aircraft operations and the like. Different applications of SEPIC converters may require different components and/or different input voltage ranges. It is thus to be understood that the resistance of the resistors R303 and R304 may be modified to suit the particular application or input voltage range of the SEPIC converter circuit in use. In other words, when the non-linear relationship 501 between input voltage and required error current is different from the relationship illustrated in FIG. 5, as it may be for different SEPIC circuits, then the resistance of the resistors R303 and R304 may be modified to better approximate the different non-linear relationship.

The choice of Zener diodes D301 to D303 according to preferred embodiments of the present invention is also important, and depends on the SEPIC converter circuit in which the preferred embodiment of the invention is used. For the test SEPIC converter circuit according to FIGS. 4 and 5, the first Zener diode D301 has a Zener voltage of 6 V, the second Zener diode D302 has a Zener voltage of 15 V, and the third Zener diode D303 has a Zener voltage of 15 V. The first Zener diode D301 has a Zener voltage of 6 V because, according to FIG. 4, the third line 403, that represents the actual current limit of the test SEPIC converter circuit, moves above the second line 402, that represents the ideal current limit, at an input voltage of 6 V. In FIG. 5, 6 V also denotes the start of the first asymptotic relationship 502. Similarly the second Zener diode D302 and the third Zener diode D303 have a Zener voltage of 15 V because, according to FIG. 5, the first asymptotic relationship 502 ends at an input voltage of 15 V and the second asymptotic relationship 503 begins at an input voltage of 15 V. The Zener diodes D302 and D303 are therefore used to switch the pseudo constant peak measurement circuit 300 between exhibiting the first asymptotic relationship 502 and the second asymptotic relationship 503. It is important that the Zener diodes D302 and D303 have the same Zener voltage to ensure that the switching between the two asymptotic relationships 502 and 503 happens smoothly and without a break or interruption.

It is therefore clear that the first Zener diode D301 performs the function of defining the starting point of the first asymptotic relationship 502, or in other words, setting the variable active state minimum threshold voltage of the first primary branch of the pseudo constant peak measurement circuit 300. The Zener diodes D302 and D303 define the end point of the first asymptotic relationship 502 and the start of the second asymptotic relationship 503, respectively. In other words, the Zener diodes D302 and D303 define the variable active state maximum threshold of the first primary branch and the variable active state minimum threshold of the second primary branch of the pseudo constant peak measurement circuit 300. Once the Zener voltage of the first Zener diode D301 is surpassed, current can travel through the first primary branch. This pathway supplies an error current that linearly increases according to first asymptotic relationship 502. Once the Zener voltage of the second Zener diode D302 is surpassed, current travelling to the Isns pin of the controller U101 to the resistor R301 according to the first asymptotic relationship 502 becomes constant. Simultaneously, since the Zener voltage of the Zener diodes D302 and D303 are equal, current can travel through the second primary branch through resistor R304 to the Isns pin of the controller U101 to supply the error current according to the second asymptotic relationship 503.

It is therefore to be understood that the test SEPIC converter circuit, to which reference is made above and to which FIGS. 4 and 5 relate, is an example of a SEPIC converter to which the pseudo constant peak measurement circuit 300 according to a preferred embodiment of the present invention can be connected. However, a preferred embodiment of the present invention can also be used in other SEPIC converter circuits, with different input voltages and other characteristics that produce different data to FIGS. 4 and 5, as well as boost topology converters. In a preferred embodiment of the present invention, the resistors R303 and R304 control the rate of change of error current provided to the Isns pin of the controller U101 according to some change in input voltage.

In other words, the resistors R303 and R304 control the gradient of the first asymptotic relationship 502 and the second asymptotic relationship 502 respectively. In the a preferred embodiment of present invention, the first Zener diode D301 controls the flow of current through the resistor R303 and hence defines the start of the first asymptotic relationship 502. The second Zener diode D302 fixes the voltage at the emitter of switch Q301, causing the first primary branch to be in the constant active state, and hence defines the end of the first asymptotic relationship 502. The third Zener diode D303 controls the flow of current through the resistor R304 and hence defines the start of the second asymptotic relationship 502. These components are included in the pseudo constant peak measurement circuit according to a preferred embodiment of the present invention, but may take different values or ratings from the values discussed with reference to FIGS. 4 and 5.

Figure 6:
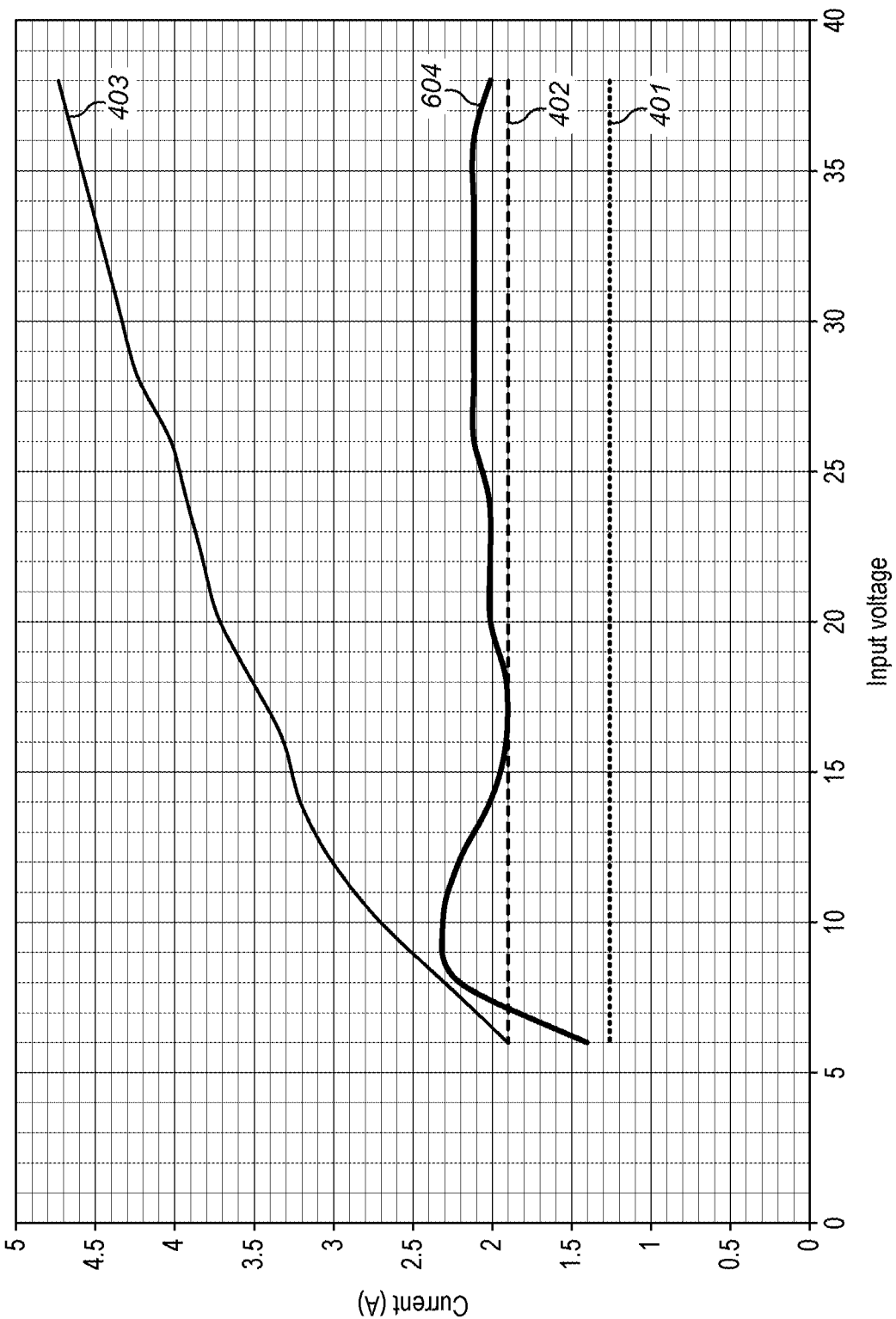
FIG. 6 is a graph displaying four current limits from the SEPIC DC-DC converter test circuit.

An effect of the pseudo constant peak measurement circuit according to preferred embodiments of the present invention is that the current limit is stabilized across the input voltage range. The current limit from the test SEPIC converter circuit, to which the pseudo constant peak measurement circuit 300 according to a preferred embodiment of the present invention is connected, is shown in FIG. 6. In particular, FIG. 6 shows the first 401, second 402 and third 403 lines according to FIG. 4, as well as a compensated current limit line 604 that corresponds to the current limit of the test SEPIC converter circuit including the pseudo constant peak measurement circuit according to a preferred embodiment of the present invention. As can be seen from the compensated current limit line 604, the current is approximately stabilized at the level of the second line 402, which represents the ideal current limit of the test SEPIC converter. The compensated current limit line 604 is approximately constant across the entire voltage input range.

Therefore, the pseudo constant peak measurement circuit 300 according to a preferred embodiment of the present invention maintains the current limit as a low, near constant value across the voltage input range. This means that, unlike the SEPIC converter circuit discussed with reference to FIG. 1, high power capacity components are not required because overcurrent events will not have the same magnitudes when the pseudo constant peak measurement circuit 300 according to a preferred embodiment of the present invention is used. Furthermore, unlike the SEPIC converter circuit discussed with reference to FIG. 2, less components, and no amplifiers or comparators external to the PWM controller U101 are required to control the current limit of the circuit when the pseudo constant peak measurement circuit 300 according to a preferred embodiment of the present invention is used. Therefore, the pseudo constant peak measurement circuit 300 according to a preferred embodiment of the present invention ensures that the circuit is safer, less likely to be damaged by an overcurrent event, and is less space-consuming and costly than known SEPIC DC-DC converters.

It is to be understood that the pseudo constant peak measurement circuit 300 according to a preferred embodiment of the present invention is also suitable with a boost converter circuit topology. FIG. 3 shows the pseudo constant peak measurement circuit according to a preferred embodiment of the present invention connected to a SEPIC topology circuit; however, preferred embodiments of the present invention can also be used in a boost topology, without the second inductor L102 and capacitor C101.

Preferred embodiments of the present invention may take the form of a converter device of either a boost or SEPIC topology. The converter device may advantageously be used as part of power switching electronic devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converter including a SEPIC or boost topology, the DC-DC converter comprising:
a power input terminal;
a power output terminal;
a first switch;
a switching controller including a signal sensing input to detect a current at the first switch and to supply a control signal to the first switch to turn the first switch on or off, switching of the first switch controls a duty cycle of the DC-DC converter in dependence on the current detected at the first switch, and an output current at the power output terminal varies non-linearly depending on an input voltage at the power input terminal and on the duty cycle of the DC-DC converter determined by the switching controller; and
a current limiting circuit to limit the output current, the current limiting circuit including an input side connected between the power input terminal and the power output terminal, and an output side coupled to the signal sensing input of the switching controller, the input side and the output side being connected by at least a first signal path, and the current limiting circuit being capable of outputting a first variable error signal through the first signal path to the signal sensing input of the switching controller; wherein
the first variable error signal varies according to a first linear relationship with the input voltage of the DC-DC converter to compensate the output current at the power output terminal that varies non-linearly to provide a pseudo constant current at the power output terminal.

2. The DC-DC converter of claim 1, wherein the first signal path is operable over a first range of input voltages to provide the first variable error signal to approximate a non-linear error signal needed to compensate the output current at the power output terminal that varies non-linearly over the first range of input voltages.

3. The DC-DC converter of claim 2, wherein
the current limiting circuit further includes at least a second signal path that connects the input side to the output side; and
the second signal path is operable over a second range of input voltages to provide a second variable error signal that approximates the non-linear error signal needed to compensate the output current at the power output terminal that varies non-linearly over the second range of input voltages.

4. The DC-DC converter of claim 3, wherein the first and the second ranges of input voltages are discrete contiguous ranges of input voltages.

5. The DC-DC converter of claim 3, wherein
each of the first signal path and the second signal path includes a path enabling component to activate the first signal path or the second signal path in which the path enabling component is included to output the first variable error signal or the second variable error signal to the switching controller when a predefined input voltage enabling threshold of the path enabling component is reached.

6. The DC-DC converter of claim 5, wherein the predefined input voltage enabling threshold of the first signal path and the predefined input voltage enabling threshold of the second signal path are different, such that the first signal path and the second signal path are activated sequentially.

7. The DC-DC converter of claim 5, wherein the current limiting circuit includes a path limiting component to limit a magnitude of an output of the first variable error signal from the first signal path.

8. The DC-DC converter of claim 7, wherein the path limiting component is able to limit the magnitude of the output of the first variable error signal from the first signal path when the input voltage reaches a predetermined cut-off threshold, the predetermined cut-off threshold being a highest voltage in the first range of input voltages.

9. The DC-DC converter of claim 7, wherein the path limiting component includes a fixed voltage regulator connected to the first signal path and to the power input terminal.

10. The DC-DC converter of claim 9, wherein the fixed voltage regulator includes a second switch connected in series in the first signal path, and a Zener diode coupled to a control terminal of the second switch and coupled to a connection to ground.

11. The DC-DC converter of claim 5, wherein the first signal path includes a first resistive element connected in series, and the second signal path includes a second resistive element connected in series.

12. The DC-DC converter of claim 11, wherein the first and the second resistive elements include resistors, and the path enabling components include Zener diodes.

13. An electronic device comprising the DC-DC converter of claim 1.

* * * * *